US012590223B2

(12) United States Patent
Ha et al.

(10) Patent No.: US 12,590,223 B2
(45) Date of Patent: Mar. 31, 2026

(54) METHOD FOR PREPARING METALLOPOLYMER-BASED COATING SOLUTION

(71) Applicant: PUSAN NATIONAL UNIVERSITY INDUSTRY-UNIVERSITY COOPERATION FOUNDATION, Busan (KR)

(72) Inventors: Chang Sik Ha, Busan (KR); Yu Bin Jeon, Busan (KR); Nagappan Saravanan, Busan (KR); Jung Won Kong, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 249 days.

(21) Appl. No.: 17/998,871

(22) PCT Filed: Aug. 10, 2021

(86) PCT No.: PCT/KR2021/010607
§ 371 (c)(1),
(2) Date: Nov. 15, 2022

(87) PCT Pub. No.: WO2022/035198
PCT Pub. Date: Feb. 17, 2022

(65) Prior Publication Data
US 2023/0193077 A1 Jun. 22, 2023

(30) Foreign Application Priority Data

Aug. 10, 2020 (KR) .......................... 10-2020-0099903
Aug. 10, 2021 (KR) .......................... 10-2021-0105604

(51) Int. Cl.
C09D 181/02 (2006.01)
C08G 75/045 (2016.01)
C09D 5/00 (2006.01)

(52) U.S. Cl.
CPC ......... C09D 181/02 (2013.01); C08G 75/045 (2013.01); C09D 5/00 (2013.01)

(58) Field of Classification Search
CPC ..... C09D 181/00; C09D 181/02; C08L 81/00; C08L 81/02; C08G 75/00; C08G 75/045
See application file for complete search history.

(56) References Cited

U.S. PATENT DOCUMENTS

2015/0344652 A1 12/2015 Linxian et al.

FOREIGN PATENT DOCUMENTS

| JP | 2011136985 A | * | 7/2011 | |
| JP | 2016017175 | | 2/2016 | |
| KR | 20140025827 | | 3/2014 | |
| KR | 20160004503 | | 1/2016 | |
| WO | WO-2017034526 A1 | * | 3/2017 | .......... C08G 75/045 |

OTHER PUBLICATIONS

Zhang, J. et al. Journal of Materials Science vol. 54 pp. 5877-5897 (Year: 2019).*
Chen, Y. et al. Journal of Polymer Science vol. 58 pp. 624-635 (Year: 2020).*
JP2011136986A machine translation (Year: 2025).*
International Search Report and Written Opinion issued in Corresponding PCT Application No. PCT/KR2021/010607, dated Nov. 23, 2021 (English Translation provided).
Jeon et al., "Highly transparent, robust hydrophobic, and amphiphilic organic-inorganic hybrid coatings for antifogging and antibacterial applications" *ACS applied materials & interfaces* 12021, 13(5), 6615-6630.
Langford, C.R. *Chemical functionalization of thiol-acrylate polyHIPEs.* 2014. Durham University, Thesis, 1-131.
Meng et al., "Thiol-ene click chemistry construct superhydrophobic cotton fabric for high-efficiency water-in-oil emulsion separation." *Fibers and polymers* 2020, 21(2), 245-251.
Resetco et al., "Thiol-ene chemistry for polymer coatings and surface modification-building in sustainability and performance" *Materials horizons* 2017, 4(6), 1041-1053.
Guihua Meng, et al. Thiol-ene Click Chemistry Construct Superhydrophobic Cotton Fabric for High-efficiency Water-in-oil Emulsion Separation. Fibers and Polymers. 2020, vol. 21, No. 2, pp. 245-251.
Office Action issued in counterpart Korean Application No. 10-2021-0105604 dated Jul. 24, 2023, English machine translation provided.

* cited by examiner

Primary Examiner — Jeffrey S Lenihan
(74) Attorney, Agent, or Firm — NORTON ROSE FULBRIGHT US LLP

(57) ABSTRACT

The present invention relates to a method for preparing a transparent metallopolymer-based coating solution having excellent durability as well as excellent antifogging and antibacterial properties. The method for preparing a coating solution of the present invention comprises the steps of: adding an ultraviolet radical initiator, TMSH (trimethylolpropane tris(3-mercaptopropionate), and TESPMA (3-(trimethoxysilyl)propyl methacrylate) into a solvent containing ethyl acetate or acetone; irradiating the solution with ultraviolet rays to cause a polymerization reaction; and adding a metal precursor to the resulting solution, and then stirring same under a nitrogen atmosphere.

8 Claims, 12 Drawing Sheets

FIG. 2

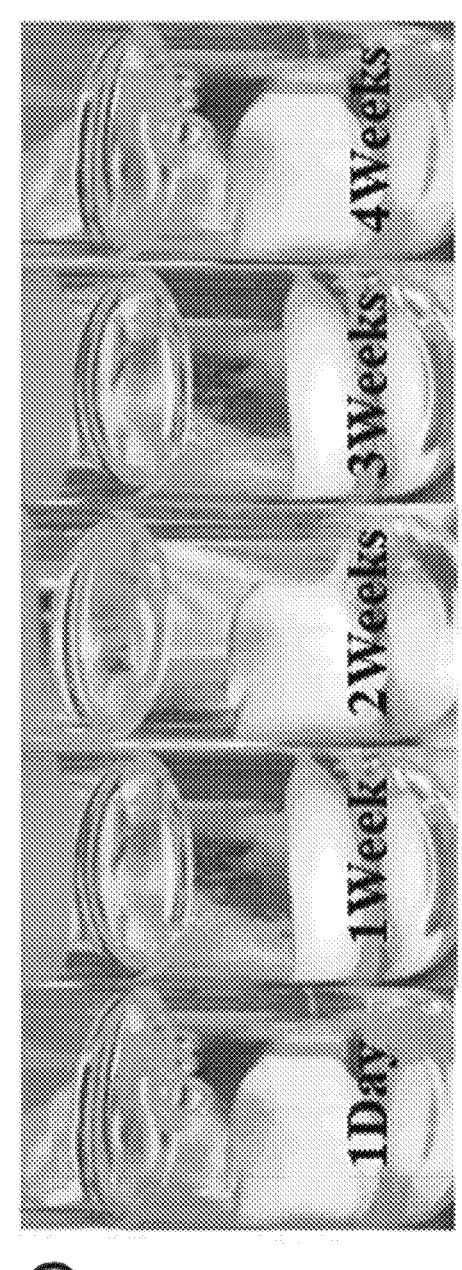
FIG. 3

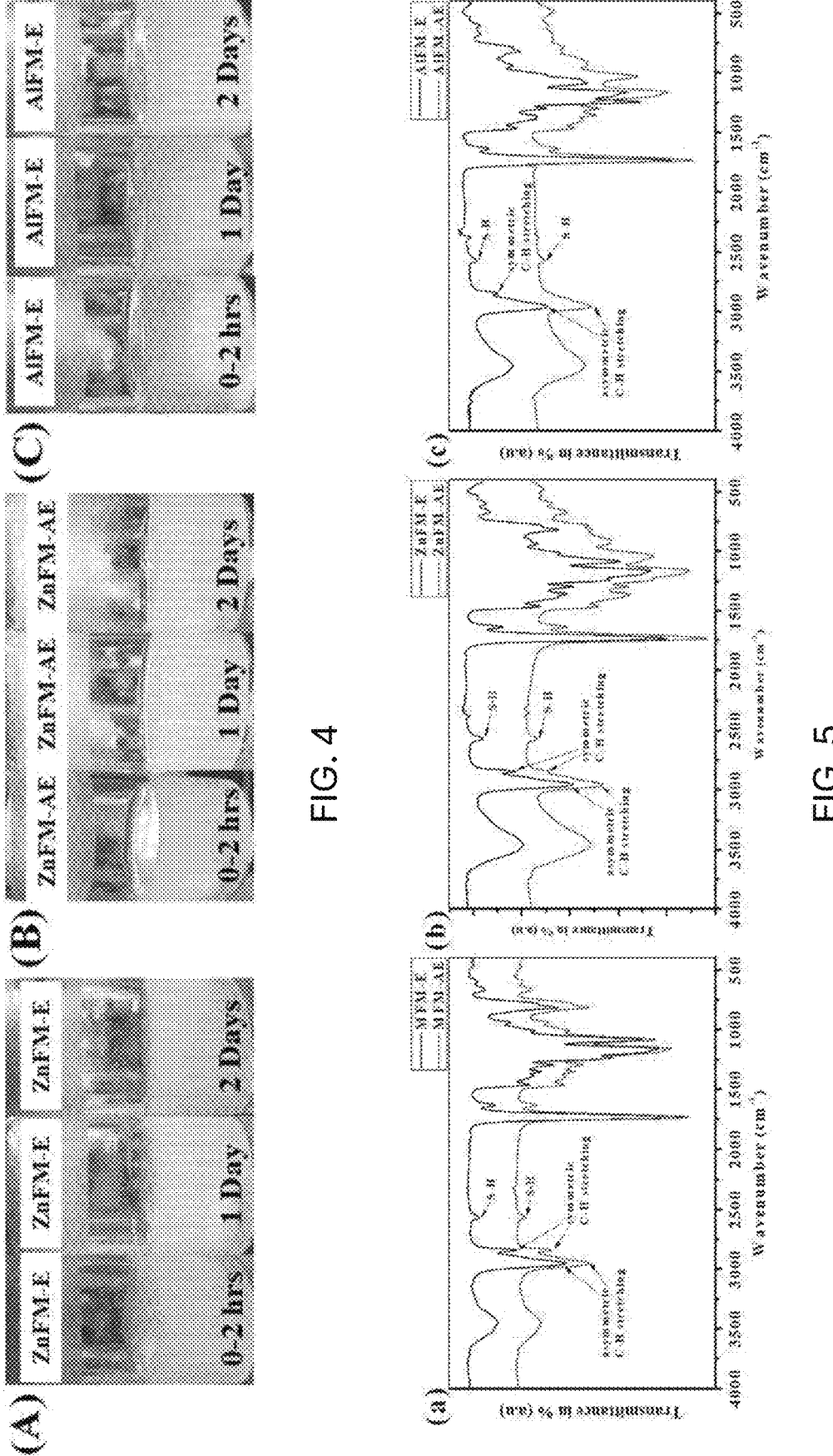

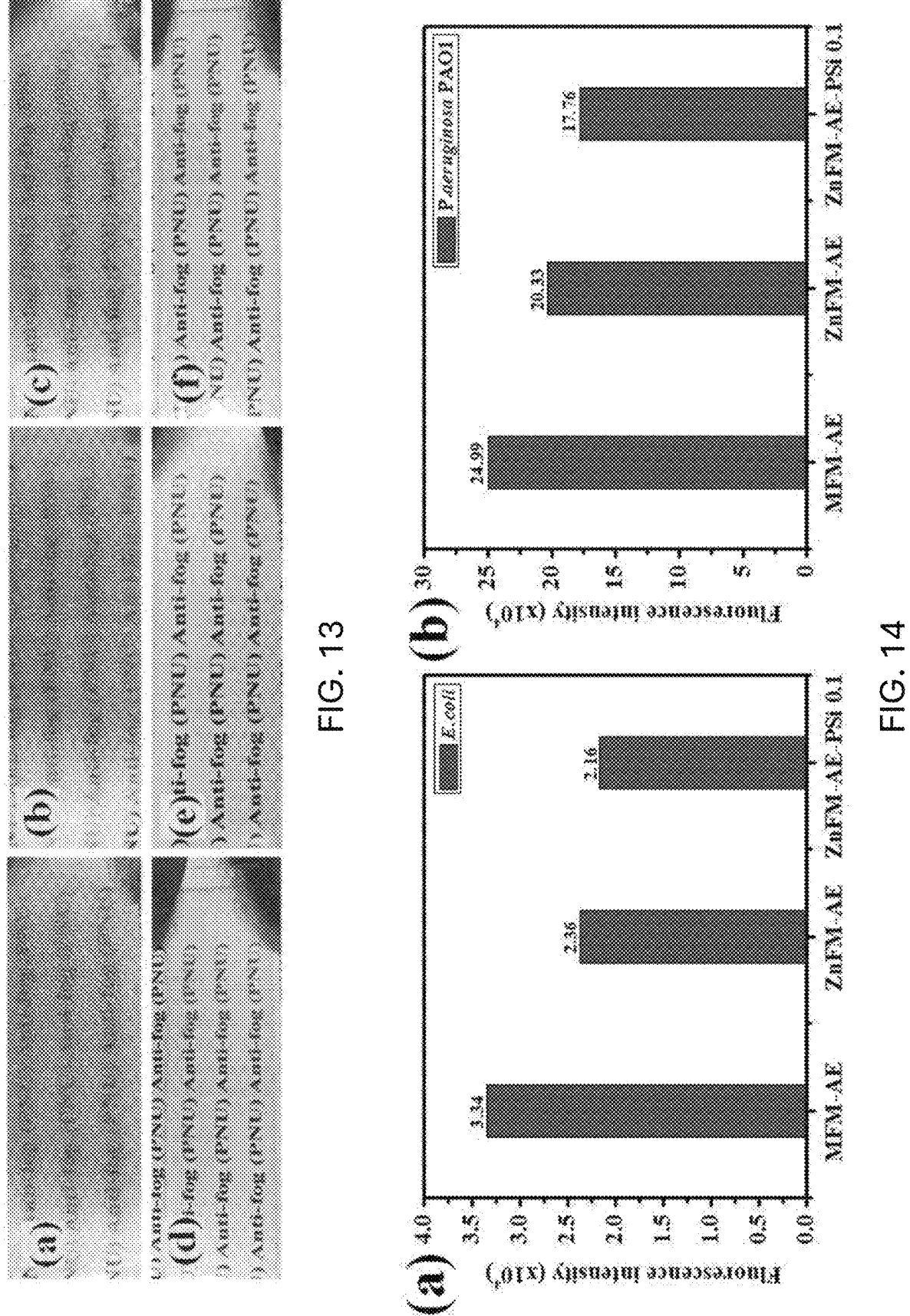

METHOD FOR PREPARING METALLOPOLYMER-BASED COATING SOLUTION

CROSS-REFERENCE TO RELATED APPLICATIONS

This application a national phase under 35 U.S.C. § 371 of International Application No. PCT/KR2021/010607, filed Aug. 10, 2021, which claims the benefit of priority to Korean Patent Application No. 10-2020-0099903, filed Aug. 10, 2020, and Korean Patent Application No. 10-2021-0105604, filed Aug. 10, 2021. The contents of each of the referenced applications are incorporated into the present application by reference in their entireties.

FIELD OF THE INVENTION

The present disclosure relates to a method for preparing a transparent metallopolymer-based coating solution having not only excellent antifogging and antibacterial properties but also excellent durability.

DESCRIPTION OF RELATED ART

A hydrophobic coating is made of a low surface energy material and is present on a substrate and repels water droplets from a surface thereof and thus has the following abilities: anti-stain, anti-fouling, anti-bacterial, anti-corrosion, anti-icing, self-cleaning, oil-water adsorption and separation, and thus has been widely used in various industrial applications such as food packaging. The hydrophobic coating is coated on the substrate to increase a lifespan of a product including the same and thus is very important. A contact angle (CA) of the hydrophobic surface may be measured using a contact angle analyzer and thus, the surface wettability of the hydrophobic surface may be determined based on the CA. In 1805, Thomas Young established a basic principle of measuring the contact angle based on a contact angle of a liquid droplet on a flat surface. The hydrophobic surface has a non-polar functional group with low affinity and resistive behavior and is free of an active functional group for hydrogen bonding and thus exhibits a contact angle of 90° to 150°. In general, a hydrophobic material is present in a form of oils, oily materials, fats, and alkanes, and exhibits smooth or rough surface morphology. Surface wettability of a rough surface or a composite surface was proposed by Wenzel and Cassie-B axter.

Recently, numerous researchers have been working on hydrophobic coatings due to the constant need for coating products in most of the products. The hydrophobic coatings mainly depend on two requirements: a micro-nano-sized layered structure and low surface energy. The presence of surface morphology of a micro-nano sized layer, and non-stick properties, waterproof properties, and self-cleaning behavior of a coating made of a low surface energy material of lotus leaf are inspired by nature. Thus, for the identification of materials inspired by nature, studies have been focused on the imitation of hydrophobic natural materials and the waterproof properties of superhydrophobic coatings. Hydrophobic coating materials may be synthesized using various schemes such as sol-gel, emulsification, a hydrothermal scheme, a solvothermal scheme, surface grafting, and modification. The hydrophobic surfaces may be fabricated by two approaches: bottom-up and top-down approaches. In the bottom-up approach, the hydrophobic surfaces may usually be obtained by sol-gel, self-assembly, electrospinning, chemical vapor deposition, etc. Similarly, in the top-down approach, the hydrophobic surfaces may be obtained by surface etching, a template, plasma treatment, lithographic patterning, and the like.

Factors affecting the hydrophobicity of organic-inorganic hybrid materials include surface energy and surface tension, types of functional groups on the surface, attractive forces between the surface of the material and water molecules, and microscopic geometry of the surface.

Recently, the development of transparent and durable hydrophobic coatings has received great attention because excellent transmittance and stable surface properties are very desirable properties required for various coating products. Van Benthem et al. found an important finding that the deposition of the hydrophobic particle layers as the first and second layers on a flat surface increases the surface wettability from the hydrophobic to superhydrophobic based on the adhesive properties of the surface particle layer. The particles of the second layer are attached to the surface of the particles of the first layer via chemical covalent bonds. Kanagasabapathy et al. applied for a patent for the development of a novel hydrophobic coating composition for reducing frictional resistance using silica aerosol. The hydrophobic properties may be controlled by varying the aerosol content in the solvent from 10 wt % to about 100 wt %. The researchers also suggested that the composition of the solvent could range from 0 wt % to 60 wt % to make better coatings. Bryan et al. have developed a new transparent hydrophobic coating using Capa 3050 Polyester polyol (polyamine) and 3-Isocyanatopropyl silane (isocyanate silane) in conjunction with perfluoropolyether silane, and then have patented their findings. It is claimed by Bryan et al. that the synthesized organic-inorganic hybrid material exhibits excellent hydrophobicity on various types of substrates.

Choi et al. synthesized a polyimide/silica nano-hybrid material using the sol-gel method, and performed spin coating of the material on a substrate, and then performed high-temperature heat treatment thereof to obtain a stable hydrophobic coating to develop a transparent glass substrate. The fabricated substrate exhibited excellent transmittance and stable hydrophobicity, as well as antifouling properties of the surface due to the presence of polyimide matrix and fluorinated silica nanoparticles on the glass substrate. Nagappan et al. also developed a new hydrophobic transparent coating on the glass substrate using a fluorinated methacrylate monomer in combination with hydrophobically modified polymethylhydrosiloxane. The fabricated substrate exhibited excellent antifouling properties and excellent hardness, as well as transmittance and hydrophobicity. The hydrophobic surface properties, hardness, and transmittance of the coating on the substrate may be controlled by varying the content of the fluorinated polymethylsiloxane in the solvent. Similarly, Sung et al. developed a novel hybrid material using a polynorbornene dicarboxylic anhydride (PNA)/fluorosilica hybrid via a sol-gel method. The glass substrate having the coating made of this hybrid material thereon exhibited good hardness and excellent antifouling properties along with excellent transmittance, hydrophobicity, and oleophobic properties. In general, hydrophobic antifouling coatings are fabricated using fluorinated materials together with polymers. Nagappan et al. also synthesized mesoporous silica nanoparticles modified with vinyl functional silane, and coated temperature-sensitive N-isopropyl acrylamide (NIPAM) on surfaces such that a highly transparent and hydrophobic glass substrate was developed. Prasad et al. modified polyamide with hydrophobically modified silica nanoparticles (HMSNPs), and spray-coated the same on a glass substrate, and subsequently dried the coating at room temperature to produce a transparent and hydrophobic superhydrophobic glass substrate.

The hydrophobicity and superhydrophobic surface properties of polyamide/(HMSNPs) were controlled based on the content of HMSNPs. Polizos et al. fabricated a transparent and hydrophobic superhydrophobic glass substrate by spray-coating fluorinated hydrophobic colloidal silica nanoparticles together with a polymer binder on the substrate. The coating of the substrate exhibited excellent self-cleaning ability and good abrasion resistance.

Similarly, transparent hydrophobic coatings are developed by various approaches using different types of hydrophobic structure directing agents. In general, fluorinated compounds are used for the fabrication of hydrophobic surfaces due to the presence of low surface energy thereof. However, at the same time, fluorinated compounds have the disadvantage that they are expensive and not environmentally friendly.

In most cases, toxic organic solvents may be used in the development of the hydrophobic coating materials and thus may pollute the surrounding air and are harmful to the environment and the human body. Recently, use of low-toxic organic solvents and fluorine-free organic compounds has attracted much attention because they may minimize a cost of the coating as well as are less harmful to the environment.

SUMMARY OF THE INVENTION

One purpose of the present disclosure is to provide a method for preparing a metallopolymer-based coating solution exhibiting high hardness and transmittance, and excellent antifogging and antibacterial properties.

A method for preparing a metallopolymer-based coating solution according to the present disclosure includes adding an ultraviolet radical initiator, trimethylolpropane tris(3-mercaptopropionate) (TMSH) and 3-(trimethoxysilyl)propyl methacrylate) (TESPMA) into a solvent including ethyl acetate or acetone to produce a mixed solution; and irradiating ultraviolet light to the mixed solution to perform thiol-ene click polymerization of trimethylolpropane tris(3-mercaptopropionate) (TMSH) and 3-(trimethoxysilyl)propyl methacrylate) (TESPMA).

In one embodiment, the method may further include spin-coating the coating solution on a substrate.

In an embodiment, the surface hardness of the substrate may vary based on variations of a type and a concentration of the metal ion.

In one example, a second layer composed of a solution of ethyl acetate and silica nanoparticles (SiNP) and polycaprolactone triol (PCT) may be formed on a surface of the coating layer of the substrate. Thus, hydrophilic surface characteristics may be improved. Thus, the antibacterial and anti-fogging properties are greatly improved while physical properties such as hardness and transmittance are maintained.

When the solution into which the metal ions are introduced is applied on the substrate or the second layer made of the solution composed of nanoparticles (SiNP) and polycaprolactone triol is formed on the substate, super-oleophilic surface properties toward oil may be improved.

According to the present disclosure, low-toxic organic solvents may be used when preparing the coating solution.

Further, the prepared coating solution exhibits very good stability when placed at room temperature.

Further, in the coating solution prepared according to the present disclosure, various types of metal ions may be introduced into a methacrylate polymer. Thus, surface properties, transmittance, and hardness of the coating may vary depending on the type of metal ions.

The substrate may be coated with a metallopolymer-based coating solution in which metal ions such as zinc and aluminum are added to the photo-chemical thiol-ene click polymerized (hereafter, "click polymerized") solution. Thus, the coating exhibits excellent transmittance of 85% or greater, exhibits a hydrophilic contact angle of 10 to 20 degrees, and exhibits both excellent antifogging properties and antibacterial properties.

In addition, the substrate coated with the coating solution according to the present disclosure exhibits excellent scratch resistance and hardness up to 8H due to the introduction of the metal ions into the click-polymerized samples.

Therefore, according to the present disclosure, a hard hydrophobic coating material with low toxicity may be prepared and may be applied onto various substrates.

BRIEF DESCRIPTION OF THE DRAWINGS

FIGS. 1 and 2 are diagrams schematically showing synthesis of an amphiphilic metallopolymer-based coating solution according to the Present Example of the present disclosure, and a surface coating fabrication using the same.

FIGS. 3 and 4 show optical images for evaluating the stability of coating solutions according to the Present Example of the present disclosure. (FIG. 3 is directed to (A) MFM-E and (B) MFM-AE, and FIG. 4 is directed to (A) ZnFM-E, (B) ZnFM-E, and (C) AlFM-E).

FIG. 5 shows FT-IR spectra of coating solutions according to the Present Example of the present disclosure.

FIG. 13 shows anti-fog properties of each of the substrates having coatings thereon according to the Present Example of the present disclosure and the transparent glass substrate (Comparative Example).

FIGS. 14 and 15 show antibacterial properties of each of the substrates against two bacteria, that is, E. Coli and p. aerugiuosa

DETAILED DESCRIPTION OF THE INVENTION

The terminology used herein is intended to describe particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
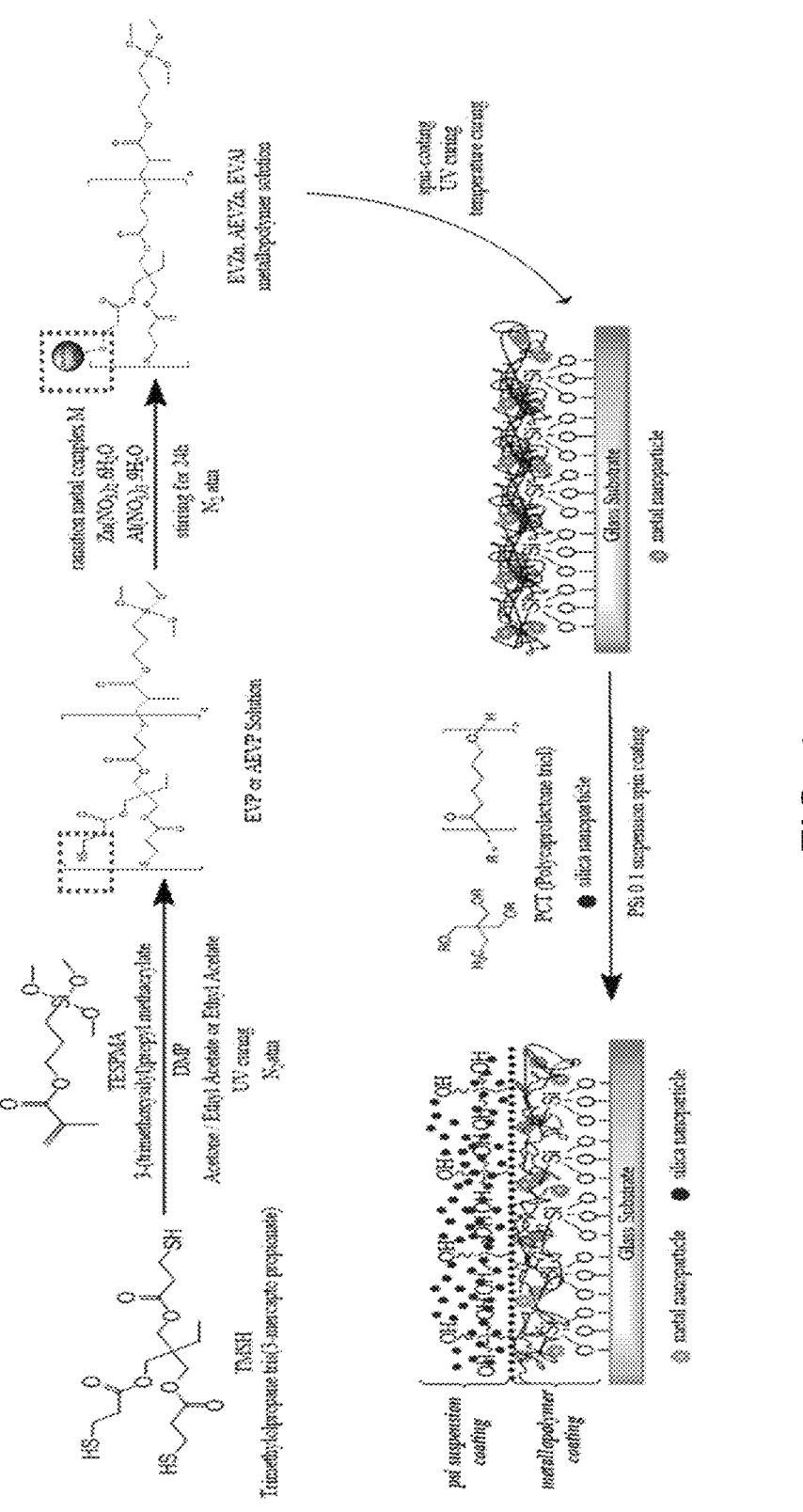
Figure 2:
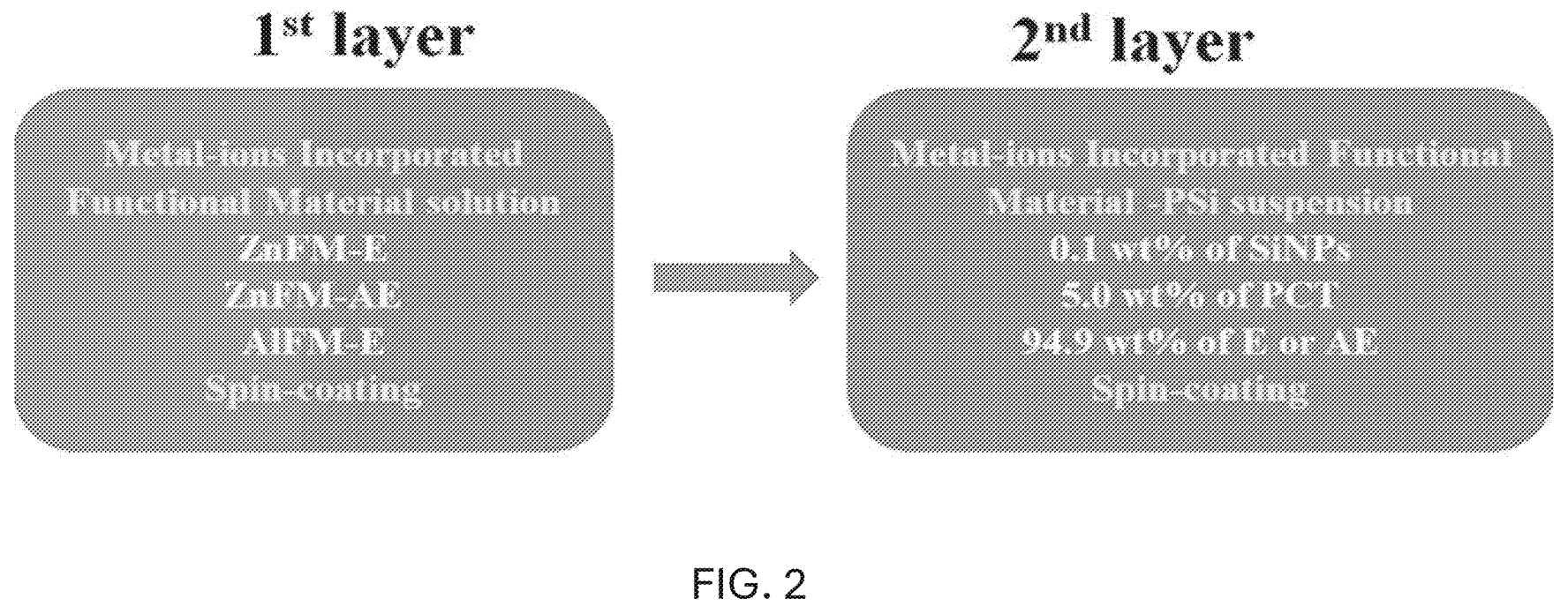

FIGS. 1 and 2 are diagrams schematically showing synthesis of an amphiphilic metallopolymer-based coating solution according to the Present Example of the present disclosure, and a surface coating fabrication using the same.

Referring to FIGS. 1 and 2, a method for preparing a metallopolymer-based coating solution according to the present disclosure includes adding an ultraviolet radical initiator, TMSH (trimethylolpropane tris(3-mercaptopropionate)) and TESPMA (3-(trimethoxysilyl)propyl methacrylate) into a solvent including ethyl acetate or acetone to produce a mixed solution; irradiating the solution with ultraviolet rays to perform polymerization reaction of TMSH (trimethylolpropane tris(3-mercaptopropionate)) and TESPMA (3-(trimethoxysilyl)propyl methacrylate); and adding a metal precursor to the solution and stirring the same under a nitrogen atmosphere.

Non-fluorinated organic compounds such trimethylolpropane tris(3-mercaptopropionate) (TMSH) and 3-(trimethoxysilyl) propyl methacrylate (TESPMA) were used in the preparation of the hydrophobic coating solution. It may be easier to handle these organic compounds to produce the hydrophobic coating. These organic compounds may be more environmentally friendly and less expensive than using fluorinated compounds In accordance with the present disclosure, low volatility organic solvents such as ethyl acetate or a mixture (acetone/ethyl acetate) of acetone and ethyl acetate were used to prepare the hydrophobic coating solution.

In accordance with the present disclosure, an easy approach such as click polymerization under UV light was used to prepare the hydrophobic coating solution.

In one embodiment of the present disclosure, the method may further include a step of spin coating the coating solution on a substrate.

In accordance with the present disclosure, after the click polymerization, the coating solution was coated on the substrate using an easy approach such as curing the coating solution on the glass substrate using a UV curable machine.

In one embodiment, the coating solution exhibited perfect transmittance on the glass substrate and has the potential to develop hydrophobic surface properties on various types of substrates.

The substrate coated with the coating material had excellent hydrophobicity. The hydrophobicity of the surface thereof was maintained by changing various metal ions to induce attraction between the metal ions and thiol functional groups.

Hydrophobicity may be changed to a certain level by using ethyl acetate or a combination (acetone/ethyl acetate) of acetone and ethyl acetate as the solvent.

Stable hydrophobic surface properties may be obtained using the coating solution according to the present disclosure. Further, the surface hydrophobicity may be improved by further modifying the surface with various hydrophobic agents.

In one embodiment, a very stable and hard coating solution may be provided in a range of pencil hardness from 4H to 8H or higher while simply changing the type of each of the metal ion and the solvent.

In one example, a second layer made of a solution of silica nanoparticles (SiNP) and polycaprolactone triol in ethyl acetate may be formed on the substrate to improve the hydrophilic surface properties for anti-fog properties.

The hydrophilically modified surface exhibited superior anti-fog performance, compared to the hydrophobic surface and maintained excellent antibacterial activity.

In other words, a hydrophilic coating formulation obtained from the hydrophobic coating surface may maintain intrinsic properties such as anti-fogging ability as well as antibacterial properties.

When the second layer made of the solution containing nanoparticles (SiNP) and polycaprolactone triol is formed on the substrate or a solution containing the metal ions is applied on the substrate, super-oleophilic surface properties to oil may be achieved.

The hydrophilic coating solution according to the present disclosure may be applied to various industrial fields such as optical lenses of medical devices, marine industries, and electronic devices.

Further, the coating solution according to the present disclosure may be applied in a very wide range of applications and on various types of substrates.

Hereinafter, various Present Examples and Experimental Examples according to the present disclosure will be described in detail. However, the following Present Examples are only some examples according to the present disclosure, and the present disclosure should not be construed as being limited to the following Present Examples.

PRESENT EXAMPLE 1

Photochemical thiol-ene Click Polymerization of TMSH (trimethylolpropane tris(3-mercaptopropionate)) and TESPMA (3-(trimethoxysilyl)propyl methacrylate) and Hydrophobic Surface Fabrication Photochemical thiolene click polymerization was performed by reacting TMSH monomer and TESPMA monomer in the same molar amount (each: 1.5 mmol) with each other using each of ethyl acetate and a mixed solution of acetone and ethyl acetate (1:1 (g/g)) as the solvent, under presence of DMP (0.05 mmol) as an ultraviolet radical initiator catalyst.

Specifically, the mixed solution containing the above materials was stirred using a magnetic bar under a nitrogen atmosphere. Then, the solution was exposed to a UV lamp at an intensity of 254 nm for 10 minutes in a completely sealed state such that the photochemical thiolene click polymerization reaction is initiated (hereinafter, each reaction product solution is referred to as each of MFM-E (ethyl acetate), and MFM-AE (acetone/ethyl acetate) depending on the type of the solvent).

Thereafter, each reaction production solution was spin-coated on a pre-cleaned glass substrate at a speed of 1000 rpm for 60 seconds, and then the coated film was cured for 1 minute at a power of 1.5 kW using a UV curing machine. Next, the glass substrate having the hydrophobic surface coating thereon was prepared by curing the coated film at 80° C. for 24 hours.

PRESENT EXAMPLE 2

Synthesis of Functional Organic-Inorganic Mixed Material Containing Metal ions and Production of Hydrophobic Surface using the same Each of various metal nitrate hydrates was added to each of the MFM-E and MFM-AE solutions according to Present Example 1, and then each solution was stirred under a nitrogen atmosphere. At this time, zinc ions, aluminum ions, iron ions, and copper ions (each: 0.05 mmol) were respectively used as the metal ions (hereinafter, the solution containing the metal ions is referred to as each of XFM-E (ethyl acetate solvent), and XFM-AE (acetone/ethyl acetate solvent) (In this regard, X=Zn, Al, Fe, Cu)).

Next, each solution containing the metal ions was coated on a substrate in the same manner as in Present Example 1 to prepare a substrate having the hydrophobic surface coating thereon.

PRESENT EXAMPLE 3

Modification of Surface of Functional Organic-Inorganic Mixed Material including Metal Ions A suspension containing ethyl acetate, polycaprolactone triol (PCT) and silica nanoparticles (SiNPs) was spin-coated on the hydrophobic surface as prepared according to Present Example 2 to modify the surface.

Specifically, the suspension was prepared as a mixture of 0.1 wt % of silica nanoparticles (SiNPs) and 5 wt % of polycaprolactone triol in 94.9 wt % of ethyl acetate. In this regard, a content of the silica nanoparticles was adjusted to 0.1wt %.

Thereafter, the suspension was coated on the hydrophobic surface of each of the substrates (ZnFM-E, ZnFM-AE and AlFM-E) as prepared in Present Example 2 in the same manner as in Present Example 1 to prepare a substrate having a surface-modified hydrophobic coating thereon (hereinafter, each resulting substrate is referred to as each of ZnFM-E-PSi0.1, ZnFM-AE-Psi0.1, and AlFM-E-Psi0.1 in order).

Specific material contents of each of the samples prepared according to the Present Example are shown in Table 1 below.

TABLE 1

| Sample | TMSH(g) | TESPMA(g) | DMP(g) | Solvent (g) | Metal nitrate hydrate (g) |
|---|---|---|---|---|---|
| MFM-E | 0.604 | 0.385 | 0.003 | 10.0 (E) | — |
| MFM-AE | 0.605 | 0.375 | 0.003 | 5.0 (A) 5.0 (E) | — |
| ZnFM-E | 0.606 | 0.392 | 0.003 | 10.0 (E) | 0.015 |
| ZnFM-AE | 0.596 | 0.378 | 0.003 | 5.0 (A) 5.0 (E) | 0.017 |
| AlFM-E | 0.597 | 0.372 | 0.003 | 10.0 (E) | 0.019 |
| AlFM-AE | 0.608 | 0.384 | 0.003 | 5.0 (A) 5.0 (E) | 0.019 |

Characterization of Coating Solution

1) Stability evaluation of coating solution according to Present Example of the present disclosure.

In order to evaluate the MFM-E and MFM-AE solutions as prepared in Present Example 2, changes were visually observed while maintaining the solution at room temperature from 1 day to 4 weeks. The observation results are shown in (A) and (B) of FIG. 3.

As shown in (A) and (B) of FIG. 3, both MFM-E and MFM-AE solutions maintained stability for over 1 month, thereby indicating excellent applicability thereof as a coating solution to various applications.

Further, ZnFM-E, ZNFM-AE and AlFM-E solutions containing the added metal ions were also evaluated in terms of stability in the same manner. The evaluation results are shown in (A) to (C) of FIG. 4.

Referring to (A) to (C) of FIG. 4, it may be identified that the solutions having the introduced metal ions therein are opaque, but maintain the stability thereof for up to 2 days or larger.

These results indicate that the coating solution according to the Present Example of the present disclosure is very stable and may be easily modified using various types of hydrophobic modifiers to improve hydrophobicity.

2) Analysis of functional group of coating solution according to Present Example of the present disclosure The chemical reaction of TMSH and TESPMA was identified.

A FTIR spectrum of the MFM-E sample (black line) shown in (a) of FIG. 5 has strong asymmetric, and symmetric C-H stretching vibration peaks of a material at 2954 cm$^{-1}$ and 2842 cm$^{-1}$. A S—H peak shown at 2568 cm$^{-1}$ means that while the reaction proceeds, a free S—H functional group remains. This is because TMSH and TESPMA react with each other in the same molar amount (1.5 mmol) in accordance with the present disclosure. Therefore, unreacted S—H functional groups remain in the MFM-E solution.

It may be identified that the MFM-AE sample in (a) in FIG. 5 also exhibits similar peak intensity, and the S—H peak exists in the sample.

Referring to (b) in FIG. 5, each of the MFM-E and MFM-AE solutions into which the metal ions were introduced also exhibited similar FTIR spectra. Further, the S—H peak slightly decreased in relation to the reaction between the S—H functional group and the metal ion.

In contrast, due to use of a small amount of the metal ions (0.05 mmol) reacting with each of the MFM-E and MFM-AE solutions, the reduction in the S—H peak did not occur completely, and thus the interaction of the S—H functional group with the metal ion was also limited under the condition of this reaction.

Figure 6:
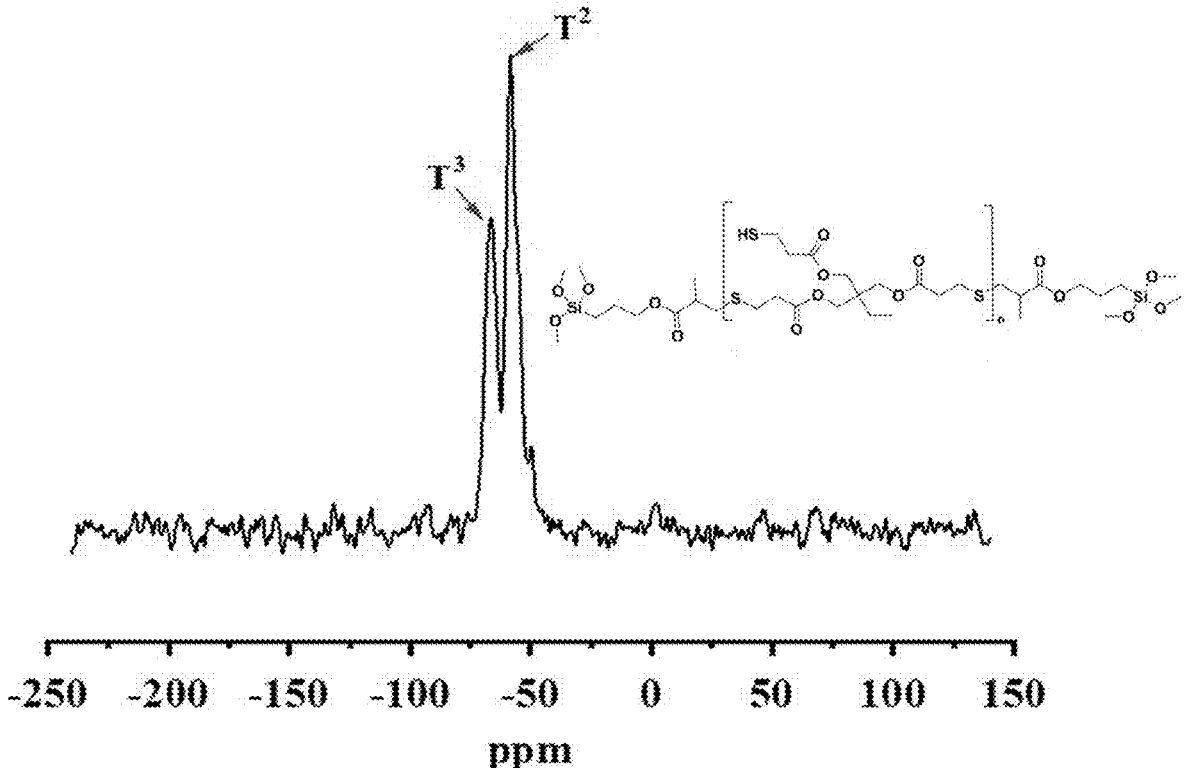
FIG. 6 shows a $^{29}Si$ NMR spectrum of the ZnFM-AE solution according to the Present Example of the present disclosure.

Further, based on the $^{29}$SiNMR spectroscopic analysis shown in FIG. 6, it was identified that in the sample (Psi0.1) in which 0.1wt % of the silica nanoparticles (SiNPs) was introduced, the silica nanoparticles were introduced therein.

Figure 7:
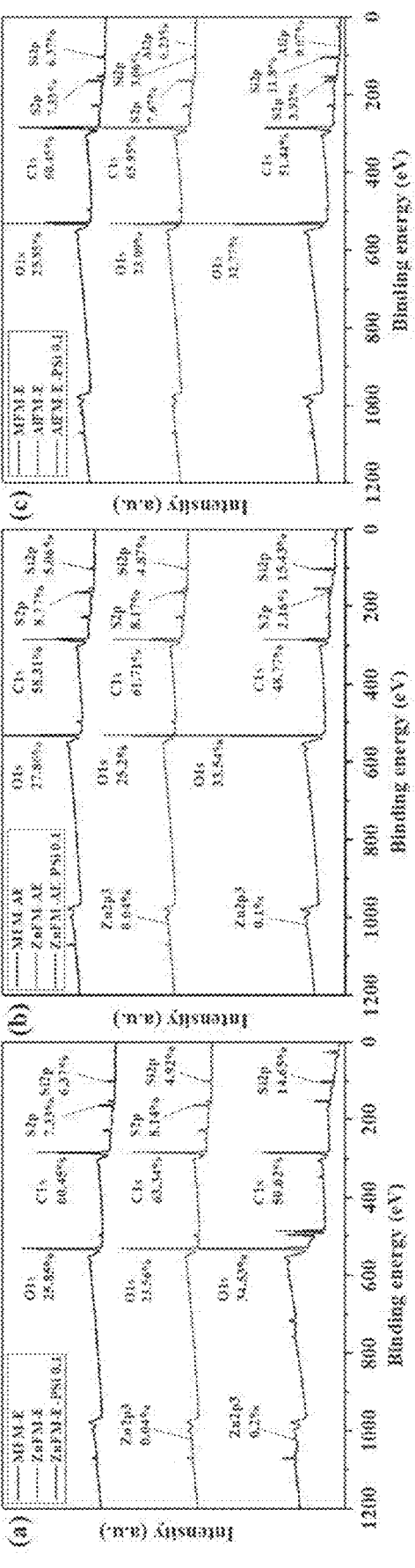
FIG. 7 shows an XPS spectrum of each of the coating solutions according to the Present Example of the present disclosure.

Further, as shown in FIG. 7, the functional groups of the click-polymerized solution and metallopolymer may also be identified based on XPS spectra.

Evaluation of properties of substrate

1) Surface Morphology

Figure 8:
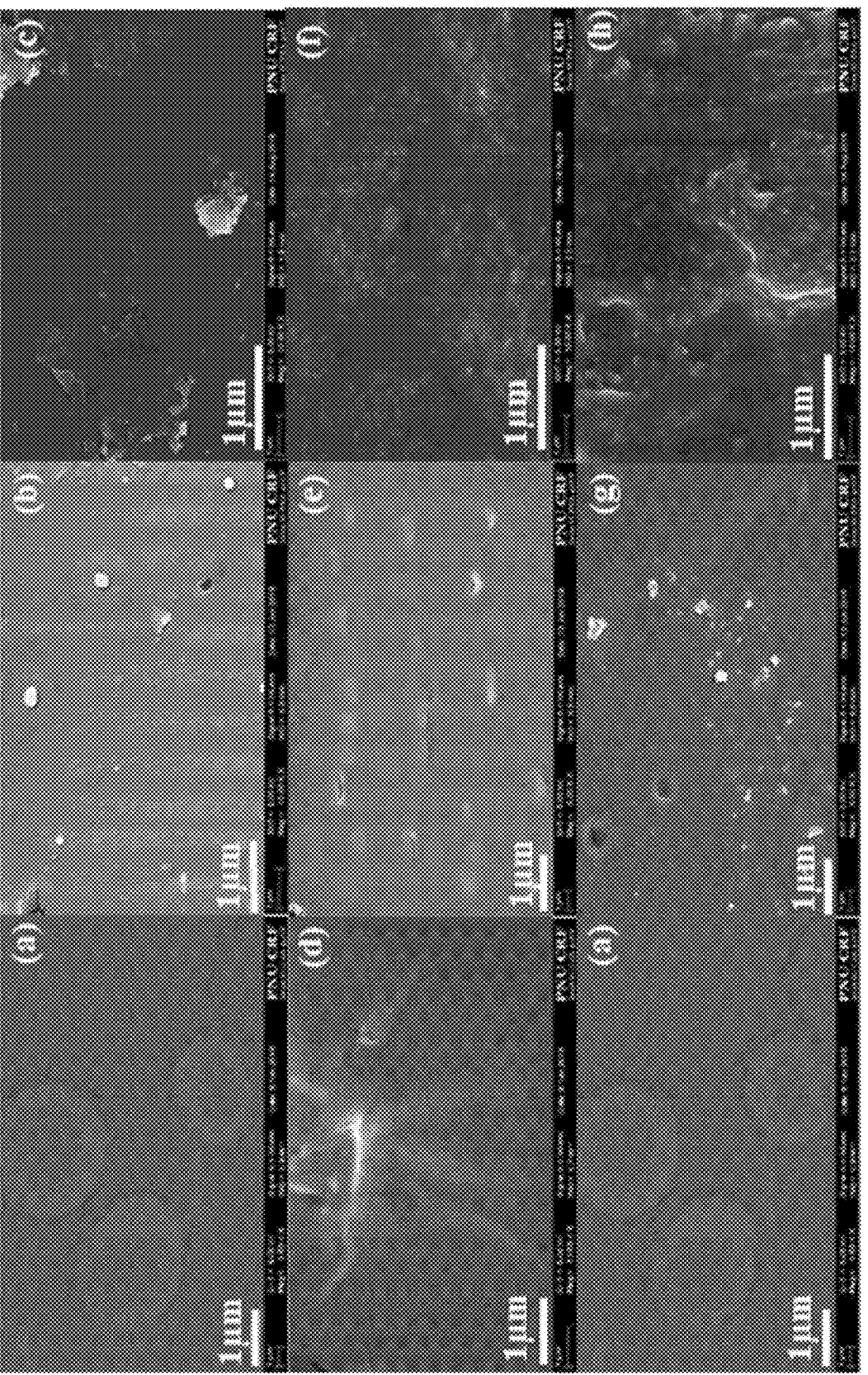
FIG. 8 is an FE-SEM image of each of the substrates having coatings thereon according to the Present Example of the present disclosure, and shows a surface morphology of each of the substrates based on addition of a metal complex. ((a) MFM-E, (b) ZnFM-E, (c) ZnFM-E-PSi 0.1, (d) MFM-AE, (e) ZnFM-AE, (f) ZnFM-AE-PSi 0.1, (g) AlFM-E, and (h) AlFM-E-PSi 0.1).

The surface morphology of the fabricated substrate was analyzed using FESEM, and is shown in FIG. 8.

Referring to (a) in FIG. 8, the fabricated MFM-E substrate exhibited a smooth surface texture due to the polymer material uniformly covering the surface of the glass substrate.

At the same time, the fabricated substrate also exhibited a partial particulate structure on the surface thereof due to ethyl acetate used as the solvent.

On the other hand, as shown in (d) in FIG. 8, when the combination of acetone and ethyl acetate was used as the solvent, a very smooth textured surface was observed.

Further, (b) and (c) in FIG. 8 show different surface morphologies when zinc metal ions are introduced. This suggests that the zinc particles diffused well into the polymer layer and a uniform particulate structure on the glass substrate and porous surface morphology occur.

However, when aluminum metal ions were introduced into the MFM-E Sample (see (g) in FIG. 8), the diffusion of the polymer and particles occurred uniformly, and it was observed that uniform nanoparticles were formed on the surface.

These results suggest that the surface morphology based on the properties of the solvent is that uniform metal nanoparticles may be deposited on the surface of the glass substrate, and the metal ions may uniformly diffuse.

Further, referring to (c), (f) and (h) of FIG. 8, even when 0.1 wt % of silica nanoparticles (SiNPs) were introduced, a uniform surface was obtained regardless of the type of the metal introduced.

2) UV-visible transmittance

UV-visible transmittance of each of the glass substrate on which the solution according to the Present Example of the present disclosure was coated and an uncoated pure glass substrates (Comparative Example) was measured using UV-Vis spectrophotometry in the wavelength range of 400 to 800 nm.

Figure 9:
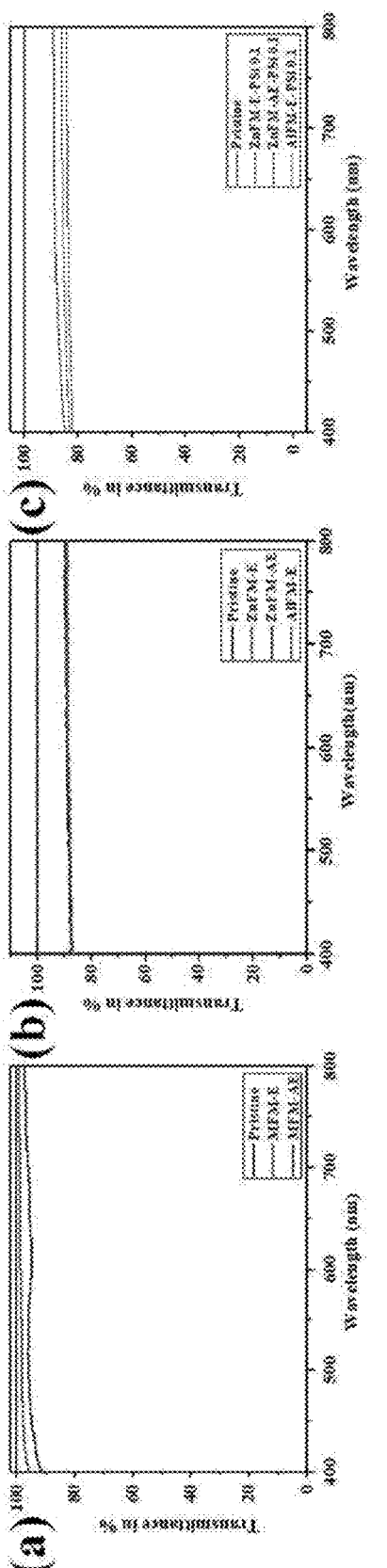
FIGS. 9 and 10 show comparing results of transmittance of a transparent glass substrate (Comparative Example) and that of each of the substrates having coatings thereon according to the Present Example of the present disclosure, using UV-Vis spectrophotometer and optical images.

In FIG. 9, (a) shows UV-Vis spectra of the MFM-E solution-coated substrate, the MFM-AE solution-coated substrate and Comparative Example, (b) shows UV-Vis spectra of the ZnFM-E solution-coated substrate, the ZnFM-AE solution-coated substrate, the AlFM-E solution-coated substrate, and Comparative Example, and (c) shows UV-Vis spectra of the ZnFM-E-Psi0.1 solution-coated substrate, the ZnFM-AE-Psi0.1 solution-coated substrate, the AlFM-E-Psi0.1 solution-coated substrate, and Comparative Example.

Referring to (a) of FIG. 9, a pure glass substrate as the comparative example exhibited almost 100% transmittance at a wavelength of 400 nm. Further, the MFM-E solution-coated substrate and the MFM-AE solution-coated substrate also exhibited high transmittance of 96% and 91.4%, respectively.

Each of the MFM-E and MFM-AE solution-coated samples maintains good transmittance because each of the MFM-E and MFM-AE solutions exhibits very good transmittance.

In one example, referring to (b) of FIG. 9, each of the metal ion-introduced solution-coated substrates also maintains high transmittance at a wavelength of 400 nm, which is slightly lowered, compared to that of each of the pure glass substrate and the substrates respectively coated with MFM-E and MFM-AE solutions. This is because the coloration of the solution to which the metal ions are added may partially limit the transmittance of the solution-coated glass substrate.

Further, as shown in (c) of FIG. 9, the transmittance of the substrate having the surface modified using the silica nanoparticle suspension was lower than that of each of the pure glass substrates and the substrates respectively coated with MFM-E and MFM-AE solutions, and was similar to that of the substrate coated with the solution containing the metal ions and thus was maintained at 80% in the visible region.

Figure 10:
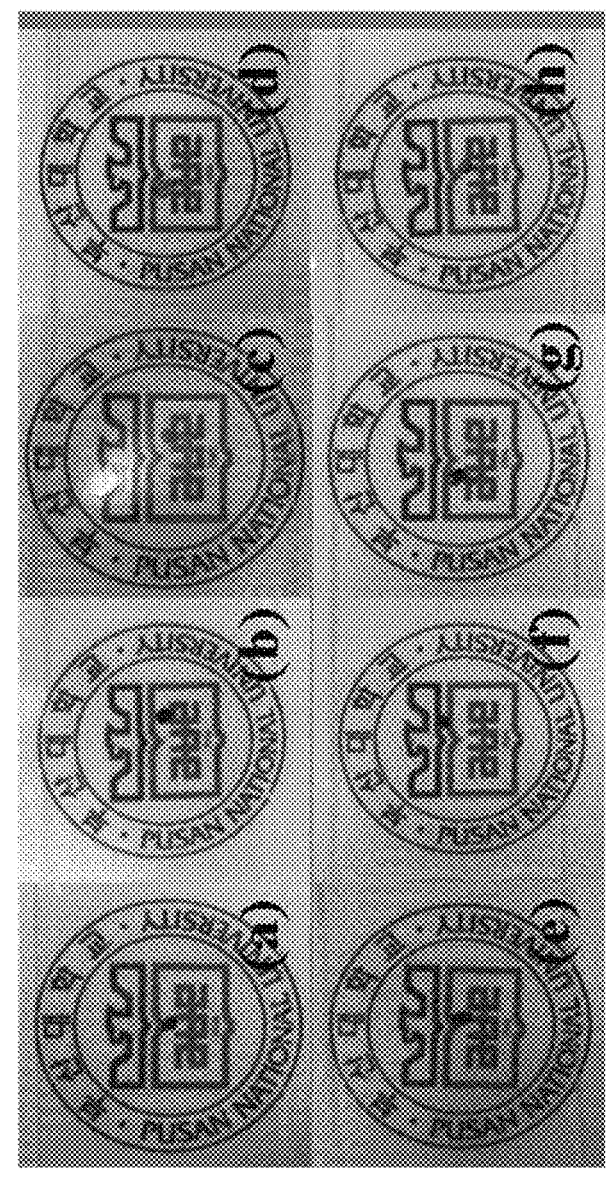

Therefore, each of the substrates respectively coated with the solutions according to the Present Example of the present disclosure may maintain transmittance of 80% or greater. This may also be identified based on FIG. 10, which shows the optical images of the fabricated substrates. (In FIG. 10, (a) is directed to MFM-E, (b) is directed to MFM-AE, (c) is directed to FeFM-E, (d) is directed to FeFM-AE, (e) is directed to ZnFM-E, (f) is directed to ZnFM-AE, (g) is directed to AlFM-E, and (h) is directed to AlFM-E)

3) Scratch Hardness Test

To evaluate the scratch hardness of the coating on the substrate according to the Present Example of the present disclosure, the test was performed according to the ASTM scheme (ASTM D 3363-74) using a Yoshimitsu pencil hardness tester D-221.

Specifically, in the test, a pencil was erected at an angle of 45° C. on the surface of the coating of each of the substrates lying horizontally and was moved along the surface three times repeatedly and then an average value of the surface scratch resistances was calculated. The pencil scratch hardness test was performed while continuously increasing the pencil hardness from 1H hardness to 8H hardness.

Table 2 below shows the surface scratch resistance of the coating of each of the substrates.

TABLE 2

| Sample | Pencil hardness | Sample | Pencil hardness | Sample | Pencil hardness |
|---|---|---|---|---|---|
| MFM-E | 4H | ZnFM-E | 7H | ZnFM-E-PSi 0.1 | 7H |
| MFM-AE | 4H | ZnFM-AE | 8H | ZnFM-AE-PSi 0.1 | 8H |
| | | AlFM-E | 8H | AlFM-E-PSi 0.1 | 8H |

Referring to Table 2, each of the glass substrate samples (MFM-E and MFM-AE) coated with the solution subjected to the click-polymerization and free of the metal ions exhibited lower hardness than that of the substrate coated with the polymer solution containing the metal ions.

The samples coated with the solution subjected to the click-polymerization and free of the metal ions exhibited stability up to the hardness of 4H. However, each of the glass substrate samples (ZnFM-E, ZnFM-AE and AlFM-E) coated with the polymer solution containing the metal ions such as zinc and aluminum had very good hardness up to 7H to 8H.

In particular, the ZnFM-AE and AlFM-E solution-coated glass substrate samples exhibited only very weak scratches under the 8H hardness.

This suggests that the attraction between the metal ions and the click-polymerized solution improved the adhesion of each of the substrate coated with the solution.

Further, the substrate having the surface modified with the silica nanoparticle suspension of 0.1wt % exhibited a high scratch hardness of 7H to 8H as in the substrate coated with the solution containing the metal ions. The substrate (AlFM-E-Psi0.1) having the surface modified with the silica nanoparticle suspension exhibited the best scratch hardness of 8H.

4) Surface wettability

The surface wettability of the coating on each of the substrates according to the Present Example of the present disclosure was evaluated by measuring the contact angle of the substrate surface with respect to water and oil (including hexadecane) using a contact angle meter. Specifically, an average value of static contact angle (SCA) values measured at atleast five different locations on the substrate surface was set as the contact angle.

Figure 11:
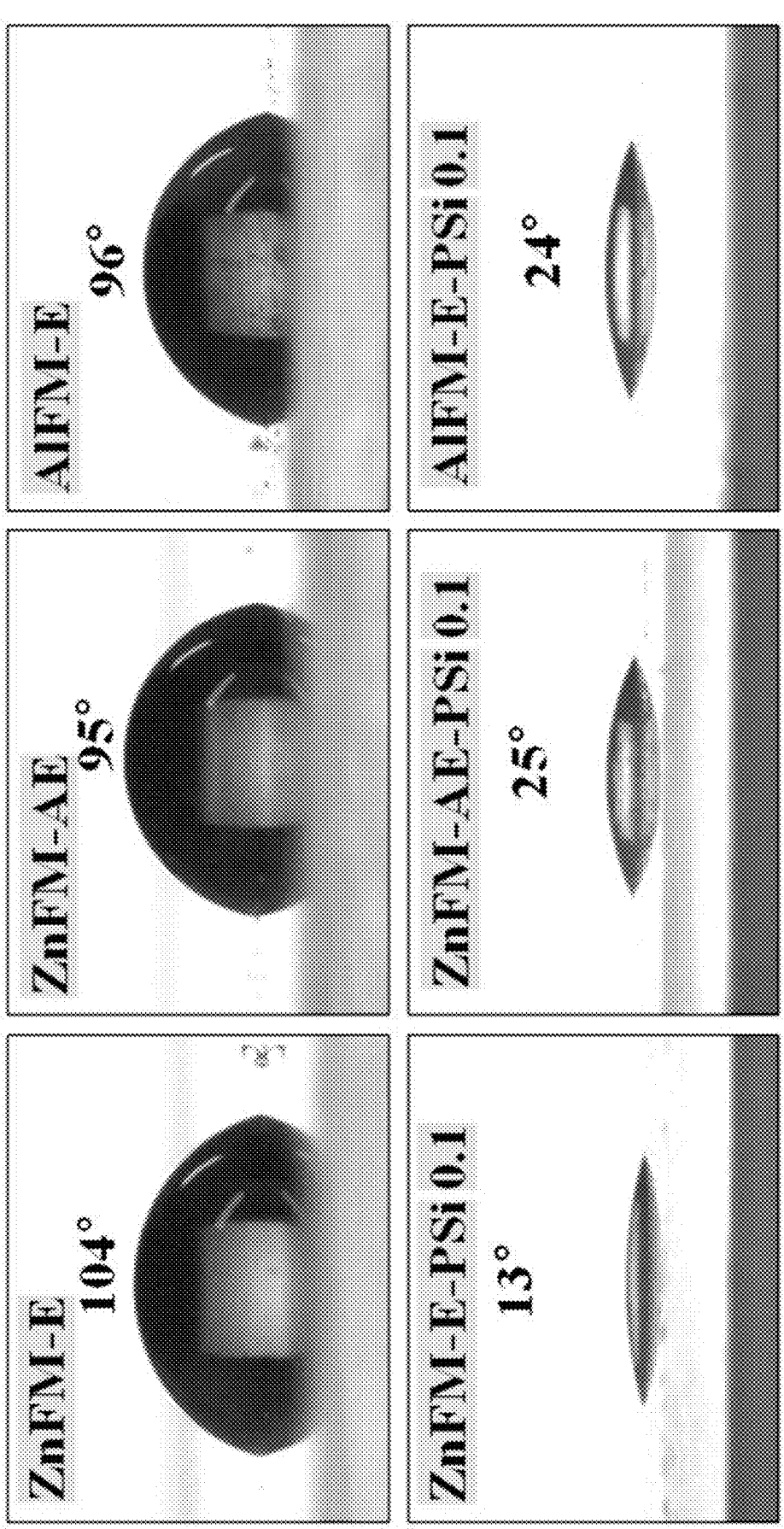
FIGS. 11 and 12 show the surface wettability of each water and oil on each of a transparent glass substrate (Comparative Example) and each of the substrates having coatings thereon according to the Present Example of the present disclosure, based on surface contact angle measurements.

FIG. 11 shows the result of measuring the surface contact angle of the substrate according to the Present Example of the present disclosure.

The pure glass substrate exhibits a hydrophilic surface contact angle (60°±1.0°) because there are many hydrophilic hydroxyl groups on the surface thereof. The pure glass substrate is coated with the click-polymerized solution and thus exhibits hydrophobic properties.

A case in which ethyl acetate was used as the solvent and a case in which the combination of acetone/ethyl acetate was used as the solvents exhibited hydrophobic surface contact angles of 103.5°±3.0° and 105°±1.0°, respectively, which were similar to each other.

As shown in FIG. 11, it may be identified that the reaction of the metal ion with the click polymerized solution causes some changes in the hydrophobic behavior of the coated sample. This is because the metal ions of the hydrophilic properties exist and are distributed on the click polymerized sample with moisture affinity and on the glass substrate.

Further, it may be identified that change in the hydrophobic surface properties may occur by changing the type of the solvent constituting the coating material.

In particular, the substrate having the surface modified with the silica nanoparticle suspension of 0.1wt % had the contact angle in a range of 17° to 24° and exhibited super-hydrophilicity, compared to the substrate coated with the solution which the metal ions were added.

Figure 12:
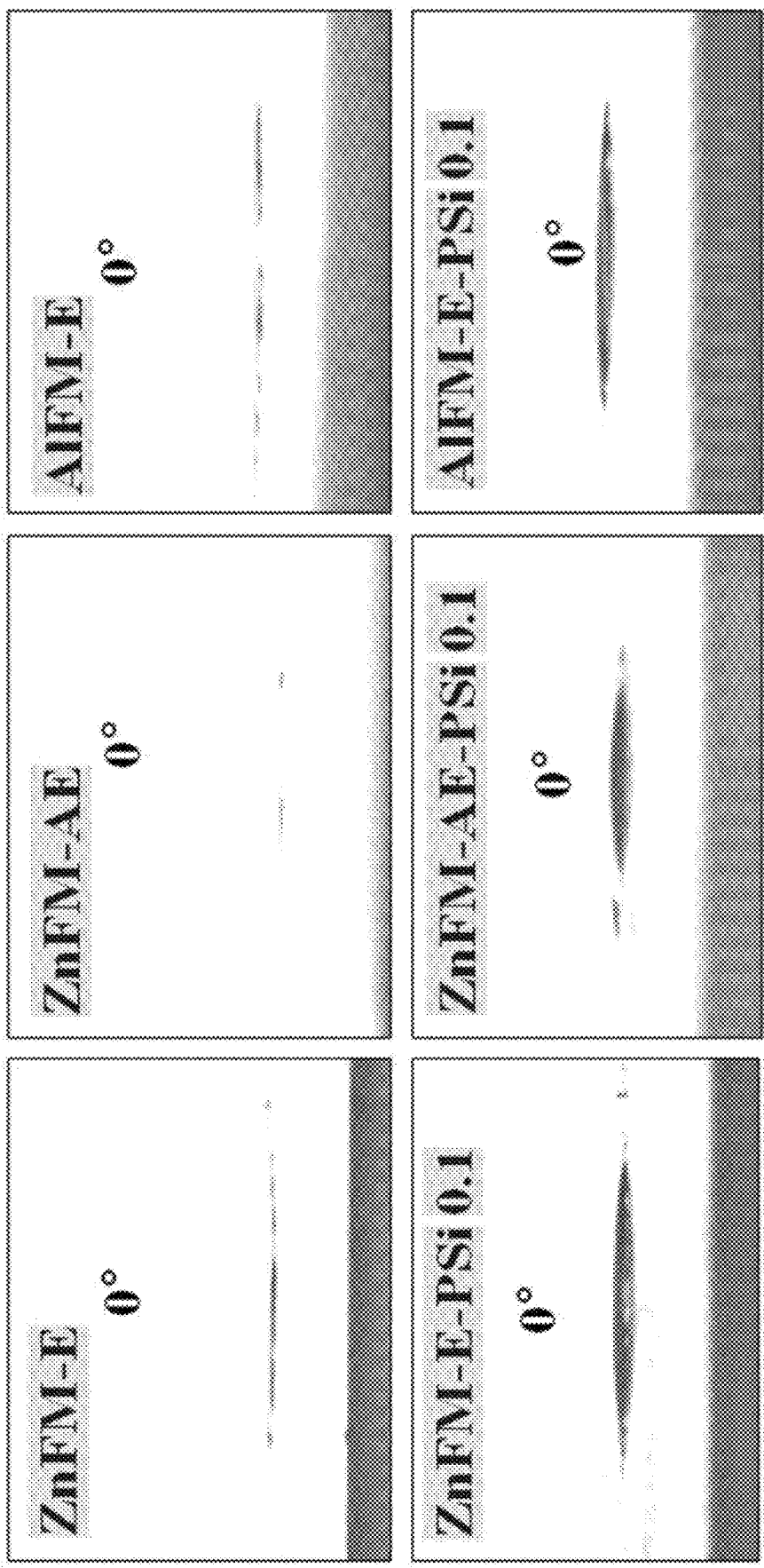

Further, referring to FIG. 12 showing the measurement result of the surface contact angle of the substrate with respect to the oil according to the Present Example of the present disclosure, both the substrate coated with the solution which the metal ions were added and the substrate having the surface modified with silica nanoparticle suspension exhibited excellent super-oleophilic properties.

5) Anti-fog Performance

The anti-fog properties were evaluated by exposing the glass substrate to hot water steam at 90° C. for each of 10 sec, 30 sec, and 60 sec. The anti-fogging of the substrate was identified by taking an optical image after exposure of the substrate to condensed water vapor. The transmittance of each of the substrates coated with the mixed material was analyzed from each of optical images before and after exposure to water vapor, after a 60 sec exposure as well as after one-time additional exposure.

FIG. 13 shows the anti-fogging behavior characteristics of each of the substrates according to the Present Example of the present disclosure. ((a) is directed to ZnFM-E, (b) is directed to ZnFM-EA, (c) is directed to AlFM-E, (d) is directed to ZnFM-E-PSi0.1, (e) is directed to ZnFM-AE-PSi0.1, and (f) is directed to AlFM-E-PSi0.1)

As shown in (d), (e), and (f) of FIG. 13, regarding each of the substrates having the surface hydrophilically modified with silica nanoparticle suspension, immediately upon penetration of moisture into the hydrophilic surface, the nanoparticles were dispersed and thus the fogging was not observed and the optical transmittance of the surface was high.

On the other hand, referring to (a), (b), and (c) of FIG. 13, fogging was observed on the hydrophobic surface into which the metal ions were introduced.

In order to more accurately evaluate the anti-fog performance, the glass substrate, the hydrophobic glass substrate, and the hydrophilic-surface-modified glass substrate were held in the air for 1 min.

As shown in (a) to (c) of FIG. 13, after 1 minute, the condensed water droplets were retained on the hydrophobic surface, thus indicating hydrophobic and low hydrophobic properties.

On the other hand, the substrate surface-modified with the silica nanoparticle suspension exhibited optical transmittance similar to that of the hydrophobized glass (see (d)-(f) in FIG. 13).

These results suggest that when the hydrophobic surface is modified with the superhydrophilic material, the modified surface has high anti-fogging performance.

The substrate having the hydrophilic coating thereon maintained transmittance after exposure to the hot water vapor, thus indicating that the stable surface properties were maintained on the surface.

6) Anti-microbial Activity

Antimicrobial activity was evaluated by culturing representative bacteria, that is, E. coli and P. aeruginosa on the surface of the substrate and then observing the adhesion of the bacteria to the surface. The antibacterial properties were evaluated based on quantitative analysis of fluorescence intensity with a fluorescence instrument.

Figure 15:
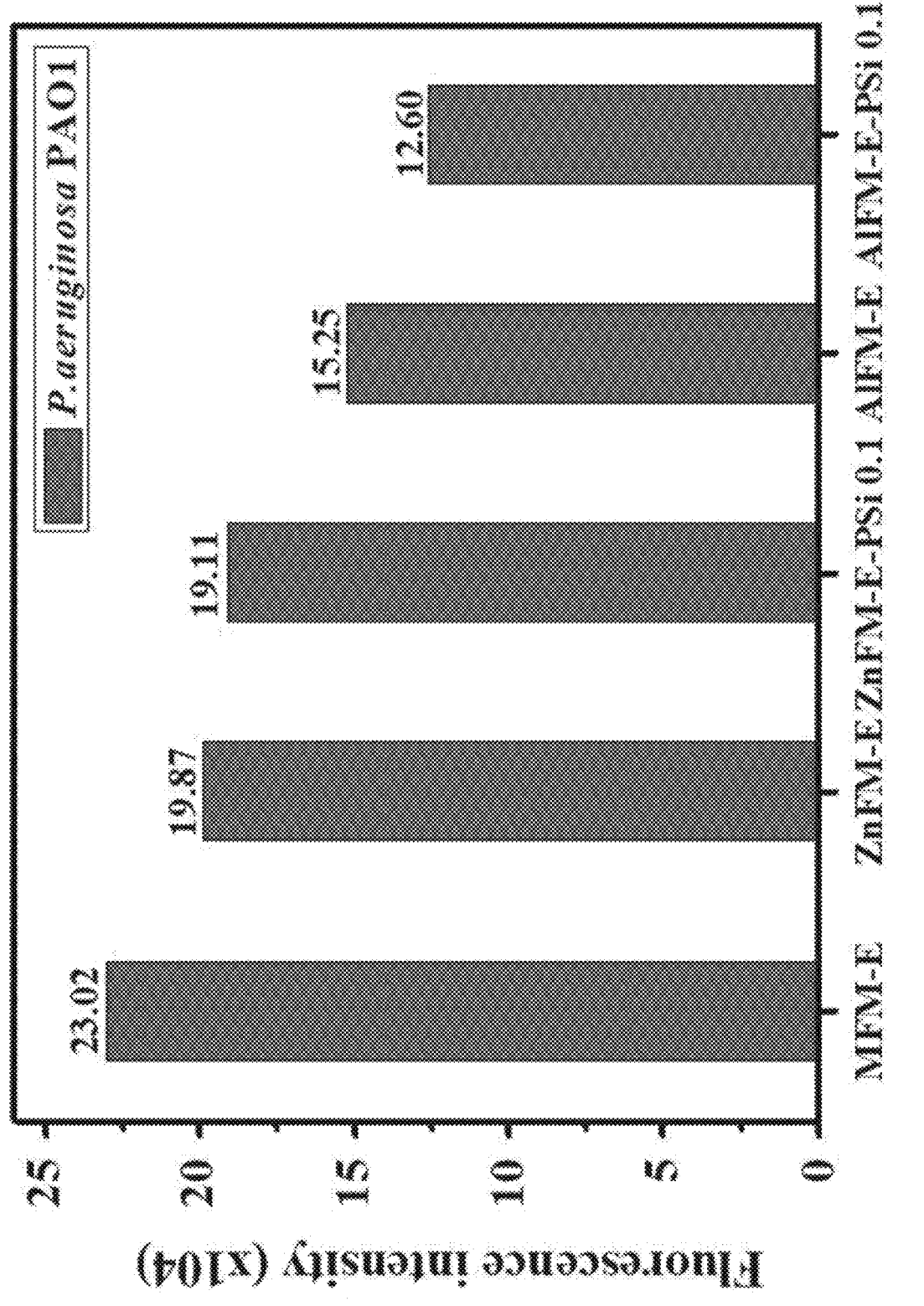

FIGS. 14 and 15 show the antimicrobial activity test results of the substrates according to the Present Example of the present disclosure.

Referring to FIG. 14, a large number of bacterial colonies were observed on the surface of the sample modified with MFM-AE. In comparison thereto, a very small amount of bacterial adhesion was observed on the hydrophobic surface modified with Zn metal ions, thus indicating strong antimicrobial activity of Zn metal ions.

It may be identified that modifying the surface to be hydrophilic surface using the silica nanoparticle suspension allows the increase in all bacteria to be significantly reduced. This result is due to the highly hydrophilic properties of the prepared surface and the presence of antimicrobial metal ions in the coating material.

Both hydrophilic and hydrophobic surfaces exhibited excellent antimicrobial activity regardless of surface wettability. However, the hydrophilic surface modified with 0.1wt % silica nanoparticle suspension exhibits further enhanced antimicrobial activity.

The combination of silica nanoparticles (SiNPs) and an amphiphilic polycaprolactone triol solution served as a thin barrier against bacterial adhesion to the coating. Therefore, the prepared substrate exhibited improved antibacterial properties against P. aeruginosa and E. coli bacteria.

Further, the improved antimicrobial properties using acetone/ethyl acetate solvent are expected to be due to the even dispersion of zinc particles on the coating surface.

In addition, in accordance with the present disclosure, the antibacterial performance of the coating material obtained by introducing aluminum ions into the hydrophilic surface modified with 0.1 wt % silica nanoparticle suspension against P. aeruginosa was tested. The test result is shown in FIG. 15.

As shown in FIG. 15 it may be identified based on the fluorescence intensity graph that the antibacterial properties were improved due to the introduction of zinc and aluminum metals into the hydrophilic surface modified with 0.1 wt % silica nanoparticle suspension and the MFM-E solution.

These results suggest that the antibacterial performance may be controlled to be excellent via use of various solvents and addition of various metal ions and silica nanoparticles.

Although the present disclosure has been described above with reference to Present Examples of the present disclosure, those skilled in the art will understand that various modifications and changes to the present disclosure may be made without departing from the spirit and scope of the present disclosure as set forth in the following claims.

What is claimed is:

1. A compound for a hydrophobic coating, the compound being a thiol-ene click polymerization reaction product of trimethylolpropane tris(3-mercaptopropionate) (TMSH) and 3-(trimethoxysilyl)propyl methacrylate) (TESPMA), wherein the compound has a structure in which a metal ion binds to a thiol group (—SH) at a middle of a chain.

2. The compound for the hydrophobic coating of claim 1, wherein the metal ion includes at least one selected from a group consisting of a zinc ion, an aluminum ion, an iron ion and a copper ion.

3. A hydrophobic substrate comprising a glass substrate and a hydrophobic surface layer coated on a surface of the glass substrate, wherein the hydrophobic surface layer is made of the compound for the hydrophobic coating according to claim 1.

4. A substrate having a surface modified to be hydrophilic, wherein the substrate comprises:

the hydrophobic substrate according to claim 3; and a hydrophilic coating layer formed on the hydrophobic surface layer of the hydrophobic substrate, wherein the hydrophilic coating layer is formed by coating a suspension containing ethyl acetate, polycaprolactone triol and silica nanoparticles on the hydrophobic surface layer and then curing the coated suspension.

5. The substrate having the surface modified to be hydrophilic of claim 4, wherein a content of the silica nanoparticles is 0.1 wt % based on a total weight of the suspension.

6. A method for preparing a coating solution based on the compound for a hydrophobic coating according to claim 1, the method comprising:

adding an ultraviolet radical initiator, trimethylolpropane tris(3-mercaptopropionate) (TMSH), and 3-(trimethoxysilyl) propyl methacrylate) (TESPMA) into a solvent including ethyl acetate or acetone to produce a mixed solution; and irradiating ultraviolet light to the mixed solution to perform thiol-ene click polymerization of the trimethylolpropane tris(3-mercaptopropionate) and 3(trimethoxysilyl)propyl methacrylate.

7. The method of claim 6, wherein the method further comprises adding a metal precursor to the mixed solution, and stirring the mixed solution under a nitrogen atmosphere.

8. The method of claim 7, wherein the metal precursor includes at least one selected from a group consisting of zinc nitrate hydrate, aluminum nitrate hydrate, iron nitrate hydrate and copper nitrate hydrate.

* * * * *